July 3, 1956
W. N. PARKER
2,753,454
ELECTRONIC CIRCUIT PROTECTION SYSTEMS
Filed Oct. 31, 1952
2 Sheets-Sheet 1
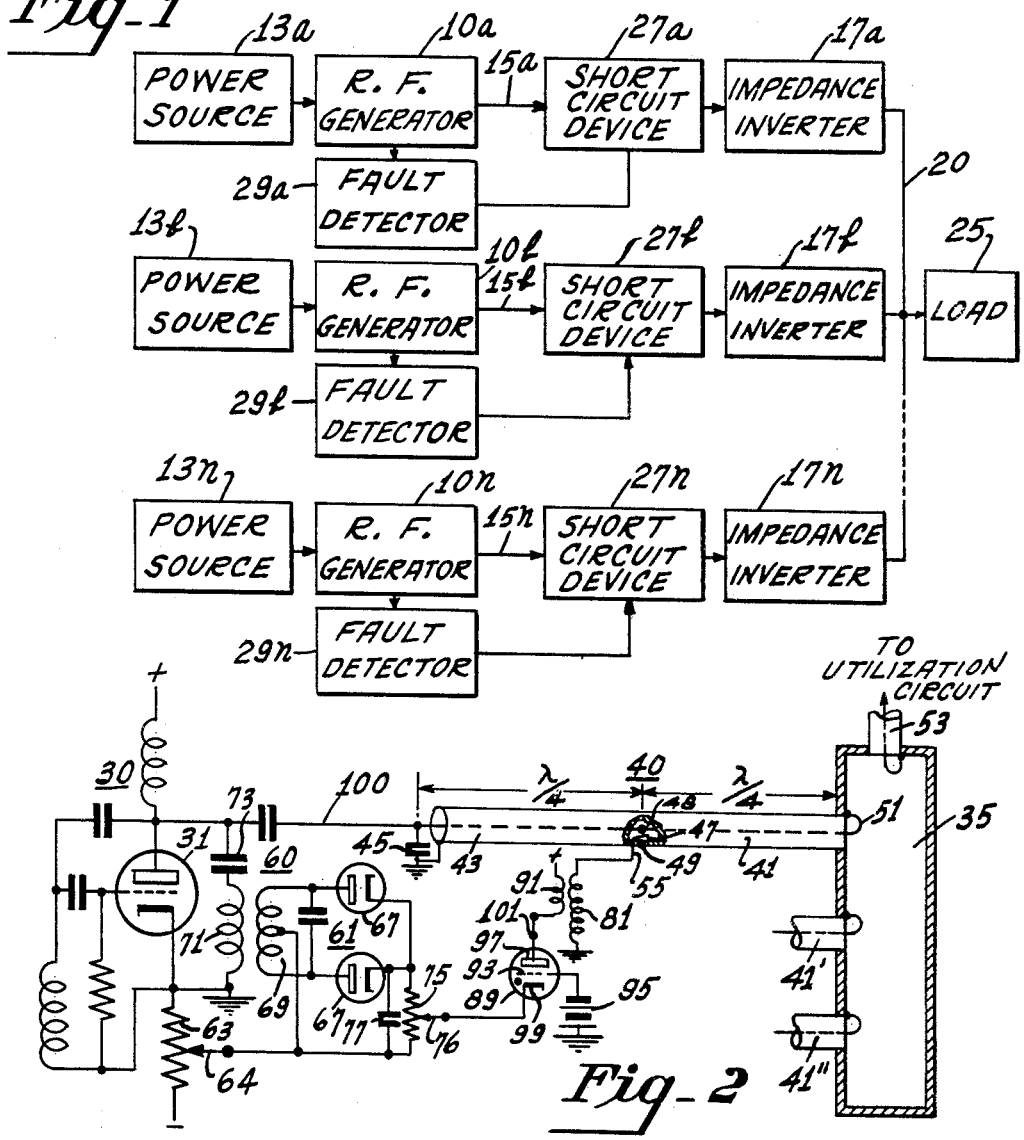
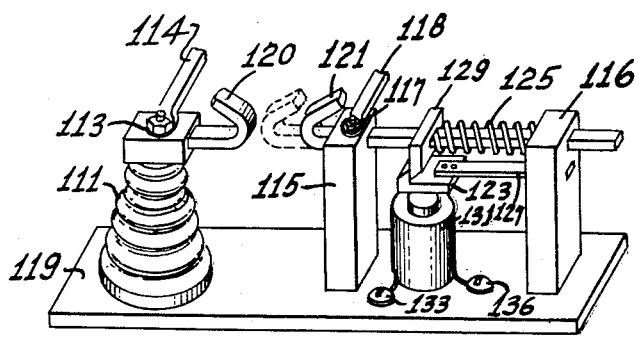
INVENTOR.
*William N. Parker*
BY *Charles H. Brown*
ATTORNEY

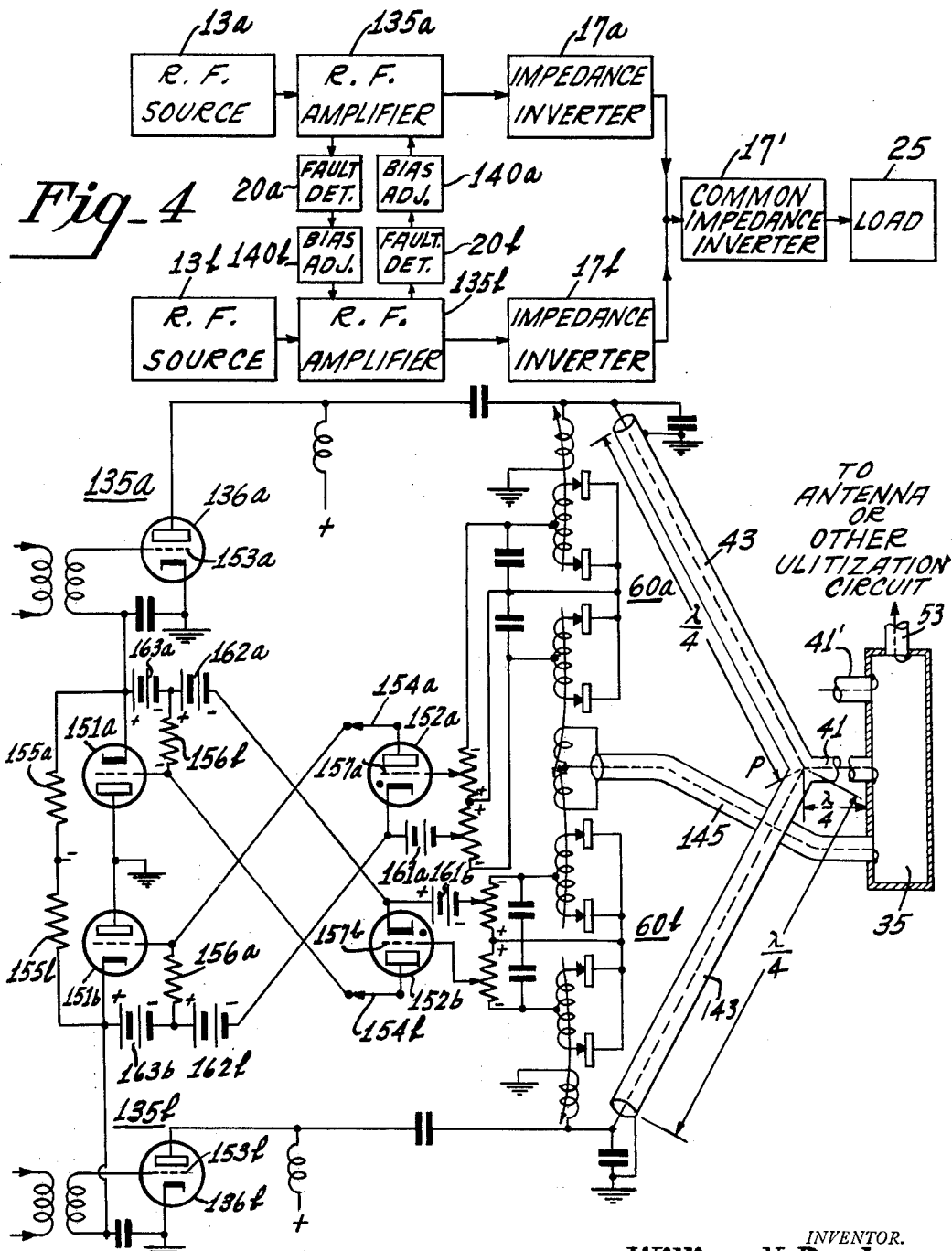

United States Patent Office 2,753,454
Patented July 3, 1956

2,753,454

ELECTRONIC CIRCUIT PROTECTION SYSTEMS

William Nelson Parker, Lancaster, Pa., assignor to Radio Corporation of America, a corporation of Delaware Application October 31, 1952, Serial No. 317,942

20 Claims. (Cl. 250—36)

The invention relates to systems for quickly protecting electric circuits from damage in the event of over-current flow, and particularly to such a system which can interrupt the flow of radio frequency power in an extremely short time. The invention is specifically directed to the protection and isolation of high-power, high-frequency electronic power generators.

High-power radio frequency tube generator installations employing a plurality of vacuum tube generators feeding a common load require high-speed interruption means between each generator and the load to prevent, in case of a fault in one generator, radio frequency (R. F.) power from flowing into the faulty generator from the other generators, and causing serious damage. As an example, a flash-arc in a tube may build up to a power-arc in about 1 microsecond. The arc is quite local so that parts of the tube structure may be quickly fused by a power input much smaller than the normal R. F. output of one generator. Serious damage may result unless the R. F. power flow into the local fault is interrupted within a few microseconds.

In some cases, the R. F. load may consist of an oscillating circuit of high figure of merit (high Q) whose stored energy is considerable and is available to feed back into a fault and cause damage to the apparatus. Without an interrupting device in the R. F. output of a generator feeding the high Q oscillating circuit, the entire installation involving a plurality of such generators must be shut down to remove or replace the faulty generator. Such shutdowns may be inopportune and very expensive.

So far as the applicant is aware, known switching devices are not suitable for high-speed interruption of high frequency R. F. power, because of mechanical considerations. Mechanical circuit breakers are too slow in their operation and not easily adapted for use with R. F. circuits. Thyratrons, ignitrons, and similar electronic devices are also unsuitable because these tubes have too long a deionization time to be usable at high frequencies. High vacuum electron tubes have been suggested for switching large amount of R. F. power but such tubes as are suitable for the purpose are comparable in size to the tubes used in the generator. Consequently, the cost of the generator would be increased considerably if such tubes were used. Also, the power loss may be considerable because of the voltage drop in the high vacuum switching tubes.

An object of the invention is to provide extremely high-speed improved fault protection for a high power R. F. oscillator.

Another object of the invention is to provide mutual protection among a plurality of electron tube generators feeding a common load, whereby one electron tube generator protects another without requiring additional high-power tubes for that purpose alone;

A further object of the invention is to enable continuous operation of an R. F. generating system by automatic high-speed isolation of faults;

Still another object is to isolate faulty equipment from the rest of the operating system to prevent further damage;

A still further object is to minimize electron tube and/or equipment damage during a fault;

A specific object of the invention is to provide an improved integrated protection system for both the input and the output circuits of R. F. generators.

The objects of the invention are attained by employing a short-circuiting device across the R. F. transmission line between an R. F. generator and the associated load, located an odd number, including unity, of quarter-wavelengths from the load. The impedance inverting property of the quarter-wave transmission line section transforms the short-circuit into an open-circuit at the load terminals, thereby preventing power in the load from flowing back through the transmission line to the generator. In one embodiment of the invention, the short-circuit is accomplished by means of an open-circuit quarter-wave line section.

The invention will be described with reference to the accompanying drawing forming a part of the specification and in which:

Fig. 1 shows a functional diagram of an embodiment of the invention;

Fig. 2 schematically illustrates the use of a spark gap in an electrical circuit arrangement according to the invention;

Fig. 3 illustrates a special form of spark gap;

Fig. 4 shows a functional diagram of a preferred form of the invention; and

Fig. 5 illustrates a working circuit embodiment of the preferred form of the invention.

The operation of the invention will be better understood by references to the functional diagram shown in Fig. 1. Several generators, 10a, 10b . . . 10n, operate to convert low frequency or D. C. power obtained from suitable sources 13a–13n into R. F. power. The R. F. power is delivered by means of transmission lines 15a–15n and impedance inverters 17a–17n to a common R. F. system-bus 20, as a result of which the generators 10a–10n may be considered as operating in parallel relationship. The R. F. power is utilized by a useful load 25 associated with the R. F. bus 20. Short-circuiting devices 27a–27n are connected across the R. F. transmission lines 15a–15n at the generator ends of the respective impedance inverters 17a–17n. Under normal conditions, short-circuiting devices 27a–27n are open and the impedance inverters 17a–17n act as transformers having a transformation ratio appropriate for effective R. F. power generation and transmission.

When it is desired to disconnect one generator from the R. F. system-bus 20, the appropriate short-circuiting device is closed. For example, in order to disconnect the first generator 10a from the R. F. bus 20, the short-circuit device 27a is closed, thereby by-passing the R. F. power flow entering impedance-inverter 17a from the bus 20. In many instances, it is highly desirable that the generators be disconnected automatically. One arrangement for such operation is suggested in the functional diagram of Fig. 1, wherein fault detectors 29a–29n having elements responsive to changes in operating characteristics of the generators 10a–10n may be used to actuate the respective short circuit devices 27a–27n. In practice, the R. F. generators 10a–10n may be vacuum tube oscillators or separately driven power amplifiers or other sources of high frequency waves.

In the arrangement shown in Fig. 2 a vacuum tube 31 is connected in an oscillator circuit 30 (corresponding to the R. F. generator 10a of Fig. 1) to supply R. F. power over a lead 100 to a high Q cavity resonator 35. The cavity resonator 35 may have a large amount of energy stored in it which could do serious damage to the oscillator tube 31 or the associated equipment in case a fault should develop. Power is transferred from the tube generator 30 to the cavity resonator 35 through the lead 100 and an R. F. transmission line 40 comprising two sections 43 and 41. Other similar generators may also be supplying R. F. power to the cavity resonator 35 as indicated by the input stubs 41' and 41''. The load transmission line section 41 may be one quarter-wavelength or an odd multiple of a quarter-wavelength at the output frequency of oscillator 30, in order to function as an impedance inverter according to well-known electrical principles. The generator transmission line section 43 may be somewhat less than an electrical quarter-wavelength long if desired, in order to help resonate the capacitor 45 to the operating frequency. The short-circuiting device is connected at the junction between the transmission line sections 41 and 43 and may be a manual or magnetically operated switch if high-speed operation is not imperative. In practice, high-speed operation is usually desirable and can be achieved by the use of a spark-gap 47, shown in Fig. 2 simply as a ball gap having one ball 48 arranged on the center conductor of the transmission line 40 and another ball 49 arranged in the sheath conductor. In event of a fault in the R. F. generator tube 31, an increase in voltage will probably take place across the transmission line 40 at the junction of sections 41 and 43 because of the disturbed impedance relations and because of R. F. power tending to flow back from the cavity resonator 35 toward the tube 31. The increased voltage at the junction causes the spark-gap 47 to pass current, thus, in effect, connecting a low impedance, approaching a short-circuit value, across the line 40 at the junction. The conducting gap 47 thus diverts power from the fault and protects the tube 31. The power dissipated at the gap 47 may be kept low by the impedance inverting action of the transmission line section 41. The low gap impedance is transformed to a high impedance at the cavity resonator end of the load transmission line section 41, thus allowing very little current to flow from the cavity resonator through the coupling loop 51 back to the tube 31. The electrodes of gap 47 can be made sufficiently massive to dissipate the energy stored in the cavity resonator 35 plus the energy flow from other R. F. generators before the latter can be turned off. Furthermore, gap electrodes are relatively inexpensive and may be considered as expendable protective devices. Although the gap 47 is shown as being incorporated into the transmission line 40, actual embodiments of the invention preferably will have an externally located spark-gap.

The conduction of the protective gap 47 may be initiated, if desired, by means of a trigger electrode 55 positioned between the balls 48 and 49. An abnormal condition in the generator circuit 30 or the tube 31 may be detected by comparing the R. F. output with the D. C. input, as described in Parker et al. in Patent No. 2,575,232. The essential components of such a differential fault detector 60 are indicated in Fig. 2. The fault signal from the detector 60 causes the trigger generating tube 89 to fire the trigger electrode 55 thus initiating conduction in the protective spark gap 47.

The fault detection circuit 60 shown in Fig. 2 includes a network 61 to derive a voltage proportional to the protected tube output voltage and a resistor 63 connected in the power supply negative return lead of the oscillator tube 31 to derive a voltage proportional to protected tube current. The network 61 comprises two rectifiers 67, 67 having anode electrodes connected to opposite ends of a resonant circuit 69. This resonant circuit 69 is tuned to the output frequency of generator 30 and is coupled to the circuit of the oscillator tube 31 through a small coupling coil 71 and a coupling capacitor 73. The cathodes of the rectifiers 67, 67 are connected through a potentiometer 75 to a center tap on the coil in the resonant circuit 69. A capacitor 77 preferably is provided to smooth the voltage across the potentiometer 75.

The magnitude of the voltage developed across the potentiometer 75 in the network 60 depends on the alternating voltage induced in the resonant circuit 69 from the output of the tube 31. On the other hand, the magnitude of the voltage developed across the resistor 63 depends on the amount of current drawn by the protected tube 31. The potentiometer 75 is connected to the resistor 63 at a variable tapping arm 64 to combine part of the voltage developed across the resistor 63 with that developed across the potentiometer 75.

A high current fault in the protected generator circuit 30 will cause the power output of the oscillator tube 31 to decrease, as will the output voltage thereof, causing a corresponding decrease in the voltage across the potentiometer 75. While this voltage change might be suitably amplified and utilized to trigger the spark-gap 47, the arrangement must be such that the gap 47 will be ionized only if the output of the tube 31 changes due to a fault, and not due to changes such as will occur when the oscillator is "keyed" off and on (modulated), for example.

By combining the voltages across the resistor 63 and the potentiometer 75 in polarity opposition, the desired differentiation between normal and abnormal operation can be obtained. The voltage relative to ground at the tap 76 of the potentiometer 75 will have a positive component proportional to the alternating voltage output of the protected tube 31, and a negative component proportional to the protected tube current. During normal operation of the tube 31, the voltage across the power supply resistor 63 will decrease or become less negative each time that the output of the tube 31 decreases, as when the oscillator is "keyed" off, for example, thereby offsetting the accompanying decrease in the positive voltage across the resistor 75. However, if a fault develops in the oscillator tube 31, the current through the tube 31 and the resistor 63 will increase, thereby producing a more negative voltage at the potentiometer tap 64, while the rectified voltage across the potentiometer 75 will decrease, or become "more negative." The net effect will be to produce an increasingly negative voltage at the potentiometer tap 76, and one which may become more negative at a rate substantially twice that of either the input change or output change of the oscillator tube 31 taken alone, although the filter choke of the conventional power supply usually prevents such a rapid increase of the input current.

When a fault is detected, the increasing negative voltage at the potentiometer tap 76 is applied to the cathode 99 of gas triode 89. The grid 93 of the tube 89 is maintained at a predetermined negative voltage by a bias battery 95, which voltage prevents conduction of the tube 89 during normal operation of the tube 31. When the cathode 99 becomes sufficiently negative, the tube 89 will suddenly start to conduct current through the primary winding 91 of a step-up transformer 90, thus inducing a high voltage impulse in the secondary winding 81. This high voltage is, in turn, applied to the trigger electrode 55 where it initiates the main discharge in the gap 47. The anode 97 of the amplifier tube 89 is connected through the winding 91 and a switch 101 to the positive terminal of a voltage source. Conduction in the tube 89 may be stopped by momentarily opening the switch 101, whereupon the circuit is reset and again ready for operation. Other resetting means such as momentarily overbiasing the tube 89 may be used and automatic resetting provisions may be arranged according to known circuitry.

The high-speed feature of the spark-gap and the low impedance feature of the electrical contacts may be combined advantageously in the short circuiting device shown in Fig. 3. An insulator 111 supporting a terminal 113 and an insulation block 115 supporting another terminal 117 are arranged on a base 119 of insulation. Spark-gap electrodes 120 and 121, in electrical contact with the terminals 113 and 117 respectively, are normally maintained in widely spaced relationship with respect to each other. A pair of electrical leads 114 and 118 connect the protected circuit to the spark-gap. The electrode 120 is fixed and the electrode 121 is slidably arranged in the block 115 and an associated support 116. A latch 123, held by a cantilever spring 127 supported by the associated member 116 in engagement with a latch block 129 rigidly fastened to the gap electrode 121, holds the electrodes apart against the force of a compression spring 125. Protection is initially afforded by spark gap conduction. For this reason, the electrodes 120, 121 are preferably of the "horn gap" type which tend to extinguish the arc once it is established. A magnet 131 connected to the fault detector circuit at terminals 133 and 136 attracts latch 123, thus allowing the electrode 121 to move under pressure of the coil spring 125 and make contact with electrode 120. The gap arc is thereby extinguished and the R. F. generator isolated from the R. F. system by the short circuit afforded by the contacting gap electrodes 120 and 121.

An alternate form of the invention is illustrated in Fig. 4. Two exciting sources of R. F. energy 13a and 13b drive power amplifiers 135a and 135b which are coupled by means of separate impedance inverters 17a and 17b to a common impedance inverter 17' coupled in turn to the load 25.

A differential fault detector 20a coupled to the R. F. amplifier 135a is used to control the action of a bias adjuster circuit 140b to increase the normal bias on the R. F. amplifier 135b in the event of a fault in the first R. F. amplifier. Another differential fault detector circuit 20b and bias adjusting circuit 140a is connected to the R. F. amplifier 135a to handle fault conditions in the R. F. amplifier 135b.

The circuit diagram of Fig. 5 shows an arrangement for performing the functions of the system outlined in Fig. 4. Triode amplifier tubes 136a and 136b and associated components constitute the respective R. F. amplifiers 135a and 135b which are coupled to the common impedance inverter in the form of a transmission line section 41 feeding the high Q cavity resonator 35 by means of individual impedance inverters also in the form of transmission line sections 43 and 143 joined in parallel at the input end of section 41.

The fault detectors 60a and 60b are essentially the same as shown in Fig. 2 except that in this case the high frequency voltage at the tube to be protected is compared with that in the cavity resonator 35. In the event of a fault in the circuit the R. F. amplifier tube 136a or 136b will have lower than normal R. F. voltage. An auxiliary transmission line 145 couples the cavity resonator to the two fault detector circuits 60a and 60b. Also semi-conductor rectifiers and fixed value resistors are shown, although any type of rectifier may be used as desired and variable resistors and capacitors may be used. The bias switching tubes 151a and 151b are arranged to be conducting normally. Negative potential applied to the grids 153a and 153b of the protected tubes 136a, 136b through resistors 155a and 155b is greatly reduced by the tubes 151a and 151b when conducting. The reset switches 154a and 154b are normally closed but the gas tubes 152a and 152b are not conducting. Upon detection of a fault in either amplifier 135a or 135b, the corresponding fault detector 60a or 60b applies a positive potential to the grid 157a or 157b of the corresponding gas triodes 152a or 152b causing it to conduct and draw current through the associated anode resistor 156a or 156b and thus bias the tubes 151a or 151b, reducing their emission. This, in turn, causes a high negative potential to be applied to the grid 153a or 153b of the amplifier tube 136a or 136b through the resistor 155a or 155b. The values of the resistors 155a, 155b, 156a and 156b as well af the various voltages obtained from the batteries 161a—163a and 161b—163b are chosen to provide normal operation of all of the tubes in the circuit. After a fault the circuit may be reset by momentarily opening the switches 154a or 154b.

Under normal conditions the two amplifiers operate in-phase and supply equal power to the cavity resonator load 35. In case of abnormal operation of the tube 136a, for example, the differential fault detector 60a develops differential bias which as explained hereinabove increases the negative bias on the grid of 136b so as to prevent plate current flow in the tube 136b. With the tube 136b blocked, the quarter-wave line 143 is open at the tube end and presents a short-circuit across the sections 41, 43 at the junction point P by virtue of the impedance inverting properties of the line section 143. The short-circuit prevents power flow into the faulting tube 136a and also prevents appreciable power flow into line 41 from the cavity resonator 35. In a similar fashion, the tube 136a could be biased off in case of a fault in the tube 136b. In other words, one tube is automatically protected by the other without additional high power tubes or equipment being required. An additional system as described can be connected to the cavity resonator 35 by means of a transmission line shown as a stub 41' to supply R. F. power to the cavity resonator 35 independently of any other such system. An antenna or other useful load device is coupled to the cavity resonator 35 by another transmission line shown in Fig. 5 as an outgoing stub 53.

The electronic short-circuit arrangement described in connection with Fig. 5 can be extremely fast-acting because the functions of fault detection, bias change, and short-circuiting of the R. F. transmission line can all be accomplished electronically within a few micro-seconds. Faults lasting only a few micro-seconds rarely cause serious damage to high-power vacuum tubes and associated equipment.

The electronic short-circuit involves relatively small power losses since no electronic or gaseous conduction paths are utilized in the high power carrying circuits, and the $I^2R$ losses in the transmission lines are less than twice the losses when both generators are supplying power. During the period when one generator represents a low impedance and the other generator a high impedance, the alternating voltage on the high impedance generator will be approximately twice normal, because all of the junction current flows into one branch. The flashover voltage ratings on the circuit components should be rated accordingly. With pulsed operation, the time of double voltage operation will be one pulse. With both generators biased off, the junction current divides equally between the two branches and normal voltage results.

It may be desirable to supplement the electronic protection of Fig. 5 with a mechanical switch to short-circuit the junction. A switch short-circuit thus effectively disconnects a pair of generators from the R. F. load and may permit tube replacement or other repairs during operation of the remainder of the R. F. system. The D. C. plate supply must be removed from the generators concerned. Spare generators may thus be kept available for operation within a fraction of a second by arranging to open the junction-short-circuiting switch between pulses of operation. Continuous operation of the R. F. installation is thus assured.

While the impedance inverting devices have been shown and described as sections of R. F. transmission line, it will be appreciated by one skilled in the art that the quarter-wave inverting properties also accrue to networks involving lumped constants such as the pi and tee type networks, described, for example, in U. S. Patents 2,259,658 and 2,234,875. Combinations of lumped and distributed constants may also be desirable. For example, in Fig. 2, the shortened line section 43 may act as a series inductor resonating the capacitor 45 and the combination functioning as a quarterwave system between the tube 31 and junction between transmission line sections 41 and 43.

The differential fault detectors may also be arranged to simultaneously remove the anode supply voltage from the generators involved by electronically "short-circuiting" the D. C. anode supply as described more fully in the U. S. Patent Number 2,575,232 previously mentioned in connection with Fig. 2.

An integrated high speed protection system of this type represents a distinct advance in circuit protection and makes practical the use of electron type generators of extremely high power.

The invention claimed is:

1. An electric circuit arrangement for interconnecting at least one source of radio frequency energy and a load element to deliver said energy thereto, including a length of transmission line connected to said source, a section of transmission line connected to said load element, a short circuiting device connected across both said length and said section of transmission line at a point substantially an odd multiple including unity of a quarter-wavelength at the operating frequency from the source and the load element respectively, means connected to said source for detecting faults therein, and means connected between said detecting means and said short circuiting device for actuating said short circuiting device in response to a fault detected by said detecting means.

2. An electric circuit arrangement as defined in claim 1 and wherein said short circuiting device includes a further portion of transmission line substantially an odd multiple including unity of a quarter-wavelength at said operating frequency.

3. An electric circuit arrangement as defined in claim 1 and wherein said short-circuiting device is a spark-gap device.

4. An electric circuit arrangement as defined in claim 3 and wherein said spark-gap has a trigger electrode to induce ionization of the medium between the electrodes of the spark-gap device and means are provided to energize said trigger electrode in response to current variations in said source.

5. An electric circuit arrangement as defined in claim 1 and wherein said short-circuiting device is a length of transmission line an odd multiple including unity of a quarter-wavelength at the operating frequency, connected at one end to said section of transmission line and arranged to be open-circuited by said actuating means at the other end in the event of a fault in said circuit arrangement.

6. An electric circuit as defined in claim 1 and wherein the length of said transmission line between said source and said point of connection of said short-circuiting device is less than a quarter-wavelength at the operating frequency by an amount effective to resonate with a component of said source at said frequency.

7. An electric circuit arrangement for connecting a load element to a radio frequency generator including an electron discharge system having at least a cathode and an anode, first means in circuit with said electron discharge system to derive a potential proportional to the voltage across said anode and said cathode, means in circuit with said electron discharge system to derive a potential proportional to another energy level of the circuit between said electron discharge system and said load element, a combining circuit to which said potentials are applied to produce a control current proportional to said applied potentials, a length of transmission line connecting said load element to said radio frequency generator, a short-circuiting device connected to said transmission line at a point substantially an odd multiple including unity of a quarter-wavelength at the operating frequency from said load element, and second means coupled to said combining circuit and said short-circuiting device and responsive to a change in said control current to actuate said short circuit device in the event of a fault in said circuit arrangement.

8. A circuit arrangement as defined in claim 7 and wherein said short-circuiting device is a spark gap device having two electrodes normally spaced apart and said second means responsive to said control current urge said electrodes into electrical contact with each other.

9. A circuit arrangement as defined in claim 7 and wherein said short circuiting device is a spark-gap device having gap electrodes and a trigger electrode and said second means responsive to said control current energize said trigger electrodes.

10. A circuit arrangement as defined in claim 9 and wherein said second means responsive to said control current includes a gaseous discharge device having a cathode connected to said combining circuit, a control electrode and an anode, biasing means applied to said control electrode, a transformer having an input winding connected in circuit with the anode of said gaseous discharge device and an output winding connected to said trigger electrode.

11. A circuit arrangement as defined in claim 7 and wherein said short-circuiting device is constituted by another radio frequency generator connected by a section of transmission line to said length of transmission line at said point thereon and said second means responsive to a change in said control current is connected to said other radio frequency generator to block the same in the event of a fault in said circuit arrangement.

12. A circuit arrangement as defined in claim 7 and wherein said combining circuit is arranged to derive a control current proportional to the voltage across the anode and cathode and to the current passing between the anode and cathode of the electron discharge system of said generator, and spark gap means responsive to said control current is connected to the length of transmission line to block the same in the event of a fault in said circuit arrangement.

13. A circuit arrangement as defined in claim 7 and wherein said means responsive to said control current include a gaseous discharge device having a cathode electrode connected to said combining circuit, a control electrode and an anode, biasing means applied to one of said electrodes, means connected in circuit with the anode of said gaseous discharge device and said short circuit device, said means being operative on direct potential of value low with respect to the radio frequency potentials.

14. An electric circuit arrangement for connecting a load element to a pair of radio frequency generators each including an electron discharge system having at least a cathode and an anode, means in circuit with each of said electron discharge systems to derive a potential proportional to the voltage across the anode and cathode of each system, means in circuit with each of said electron discharge systems to develop a potential proportional to the potential established at said load element, combining means, individual to said electron discharge systems, to produce control currents proportional to said potentials, adjustable biasing means individual to each of said electron discharge systems, the adjustable biasing means of one of said electron discharge systems being connected to the combining means of the other of said electron discharge systems, three sections of transmission line connected in parallel at given ends thereof, the other end of one of said sections of transmission line being connected to said load element and the other ends of the other sections of transmission being individually connected to said radio frequency generators.

15. A circuit arrangement as defined in claim 13 and wherein each of said sections of transmission line are an odd multiple including unity of a quarter-wavelength at the operating frequency.

16. A circuit arrangement as defined in claim 13 and wherein said one section of transmission line is an odd multiple including unity of a quarter-wavelength at the operating frequency.

17. A circuit arrangement as defined in claim 13 and wherein said other sections of transmission line have lengths at which said radio frequency generators are resonated at the operating frequency.

18. An electric circuit arrangemnet for connecting a load element to a pair of radio frequency translating devices each including an electron discharge system having at least a cathode, a grid and an anode, individual adjustable biasing circuits for the grids of each electron discharge system, three sections of transmission line connected together at given ends thereof, the other end of one of said sections of transmission line being coupled to said load element and the other ends of the other of said sections of transmission lines being individually connected to said radio frequency translating devices, means to derive a potential proportional to the voltage across at least one of said electron discharge systems, means to derive a potential proportional to the voltage across said load element, a combining circuit to which said potentials are applied to derive a control current, means to apply said control current to the biasing circuit for the other of said electron discharge systems to block the same in response to control current value indicative of a fault in said circuit arrangement.

19. A circuit arrangement as defined in claim 18 and wherein means are provided to compare the potential across the other electron discharge system with the potential across said load element and the control current derived thereby is applied to the adjustable biasing circuit individual to said one electron discharge system.

20. An electric circuit arrangement for interconnecting at least one source of alternating current energy to a utilization device to deliver power thereto and to prevent damage to said source in the event of a fault in said utilization device, including a length of transmission line connected to said source and another section of transmission line connected between said length of transmission line and said utilization device, a short circuiting device connected at the junction of said section and said length of transmission line, said section and said length of transmission line each being substantially an odd multiple including unity of one quarter of the operating wavelength, a fault detector connected to said source for detecting faults therein, and means connected between said fault detector and said short circuiting device for actuating said short circuiting device in response to a fault detected by said fault detector.

References Cited in the file of this patent

UNITED STATES PATENTS

| | | |
|---|---|---|
| 2,049,948 | Cushman et al. | Aug. 4, 1936 |
| 2,259,658 | Parker | Oct. 21, 1941 |
| 2,300,127 | Maddock | Oct. 27, 1942 |
| 2,337,184 | Carter | Dec. 21, 1943 |
| 2,485,606 | Kandoian | Oct. 25, 1949 |
| 2,558,129 | Favre | June 26, 1951 |
| 2,632,854 | Altar et al. | Mar. 24, 1953 |
| 2,644,926 | Varela | July 7, 1953 |

FOREIGN PATENTS

| | | |
|---|---|---|
| 497,035 | Great Britain | Dec. 12, 1938 |

OTHER REFERENCES

"Protecting Against Carrier Failure" by H. G. Towlson, Electronic Industries, November 1946, pages 68–71, 112, 114, 116.